(12) United States Patent
Ryu et al.

(10) Patent No.: US 8,200,397 B2
(45) Date of Patent: Jun. 12, 2012

(54) AUTOMATIC REARVIEW MIRROR ADJUSTMENT SYSTEM FOR VEHICLE

(75) Inventors: Jihan Ryu, Rochester Hills, MI (US); Kwang-Keun Shin, Rochester Hills, MI (US); Jin-Woo Lee, Rochester Hills, MI (US); Bakhtiar Brian Litkouhi, Washington, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1000 days.

(21) Appl. No.: 12/174,146

(22) Filed: Jul. 16, 2008

(65) Prior Publication Data

US 2010/0017071 A1    Jan. 21, 2010

(51) Int. Cl.
*G02B 5/08* (2006.01)
(52) U.S. Cl. .......................................... 701/49; 340/441
(58) Field of Classification Search .................. 701/49; 359/843, 877, 872; 340/438, 441, 466, 464
See application file for complete search history.

(56) References Cited

U.S. PATENT DOCUMENTS

| | | | | |
|---|---|---|---|---|
| 5,706,144 A * | 1/1998 | Brandin | ........................ | 359/843 |
| 6,176,587 B1 * | 1/2001 | Fredricks | ..................... | 359/843 |
| 6,193,380 B1 * | 2/2001 | Jacobs | ........................ | 359/843 |
| 6,590,725 B2 * | 7/2003 | Kho | ............................. | 359/834 |
| 6,840,637 B2 * | 1/2005 | Wang | ........................... | 359/843 |
| 7,373,249 B2 * | 5/2008 | Ivanov | ......................... | 701/213 |
| 7,571,041 B2 * | 8/2009 | Lee et al. | ....................... | 701/49 |
| 2005/0131609 A1 * | 6/2005 | Noda et al. | .................... | 701/49 |
| 2006/0155444 A1 * | 7/2006 | Lee et al. | ....................... | 701/49 |
| 2006/0158757 A1 * | 7/2006 | Wang et al. | ................... | 359/865 |
| 2007/0030581 A1 * | 2/2007 | Wang | ........................... | 359/843 |
| 2007/0263301 A1 * | 11/2007 | Agrest | ......................... | 359/843 |

FOREIGN PATENT DOCUMENTS

| | | |
|---|---|---|
| CN | 1171085 A | 1/1998 |
| WO | WO-2007018989 A2 | 2/2007 |

OTHER PUBLICATIONS

Rho, K. H., Automatic Mirror Adjustment System using a Driver's Pupils, IEEE vol. 1(17-21), 2002, pp. 251-258, V 258, Seoul, Korea.
Gane, J., Measurement of Vehicle Head Restraint Geometry, SAE Paper 1999-01-0639, 1999, pp. 1-7, Detroit, Michigan.

* cited by examiner

*Primary Examiner* — Khoi Tran
*Assistant Examiner* — Jason Holloway (57) ABSTRACT

Mirrors on a motor vehicle are adjusted by monitoring the position of a first, preferably manually adjusted, mirror and adjusting the position of additional mirrors based on the monitored position of the first one of the mirrors.

11 Claims, 4 Drawing Sheets

AUTOMATIC REARVIEW MIRROR ADJUSTMENT SYSTEM FOR VEHICLE

TECHNICAL FIELD

This disclosure is related to rearview mirrors presenting information to an operator of a motor vehicle.

BACKGROUND

The statements in this section merely provide background information related to the present disclosure and may not constitute prior art.

Mirrors are used in vehicular applications to provide an operator with convenient information regarding the environment surrounding a vehicle. When the vehicle is stationary or in a parking environment, mirrors provide information regarding the space in which the vehicle can maneuver, such as the location of a curb or other parked cars. When a vehicle is in motion on a roadway, mirrors provide an operator with information regarding lanes of traffic behind and next to the vehicle. Such information is especially important to a vehicle on a roadway in instances when the operator desires to change lanes, maneuvering the vehicle into an area which another vehicle may already occupy. While an operator can turn his or her head and directly view the area into which the vehicle is expected to travel, removing one's eyes from the road and turning the head to look behind the vehicle necessarily involves a disconnection of the driver from conditions in front of the vehicle. Additionally, driving can be a complicated process, with an operator making numerous decisions and adjustments in a short period of time, and quickly available information can be critical to the operator. It is therefore important and desirable for an operator to possess, in a readily discernable and non-disorienting form, as much information about the road environment as possible.

Mirrors are known to be adjusted manually, either through the direct application of force to the mirror, which is located on a freely adjusting base, for example operating as a ball-and-socket type pivot, or by a joystick operated, robotic control system, with the operator utilizing the joystick to provide signals to a side mirror actuation assembly. In either method of mirror adjustment, the biases and comfort tendencies of the operator directly impact the adjustment of the mirror.

Vehicles frequently utilize a three mirror configuration, with an interior rearview mirror being located centrally in the passenger compartment, suspended over the substantial center of the instrument panel, and a side mirror located on each side of the vehicle. Each mirror provides a field of vision or an image reflecting some visual scope of an area. Such a three mirror configuration provides a field of vision directly behind the vehicle, viewable through the rearview mirror, and a field of vision on each side of the vehicle, viewable through the side mirrors. While the mirrors provide much information about the environment surrounding the vehicle, such a configuration inevitably leaves gaps in the region surrounding the vehicle as areas not viewable through the mirrors. These gaps are known as blind spots. Methods are known to cover or capture within fields of vision blind spots left in the usual three mirror configuration. One known method to cover such blind spots is through the use of convex mirrors or mirrors with an outwardly curved reflective surface, such that the field of vision provided to the operator is expanded. Known methods to utilize convex mirrors include insetting within an existing mirror a small domed mirror or providing a separate convex mirror on either side of the vehicle in addition to the known flat side mirrors. Additionally, it is known to utilize a slightly convex or curved mirror in place of the known flat side mirrors to expand the lateral fields of vision provided by the side mirrors. While convex or curved mirrors of known configurations do expand fields of vision, the information provided to the operator is a distorted, sometimes severely distorted, visual representation. As a result, utilization of convex mirrors has been a mixed or unrealized solution to resolving problems posed by blind spots. Additionally, vehicles are known to utilize cameras and view screens to display additional information to the operator. However, such systems add cost, can be disorienting to the operator, and are similarly limited as a previously described mirror in the range of information which can be provided to the operator. As a result, the three mirror configuration remains in wide use in vehicles, representing a reliable means to provide information quickly and clearly to an operator in driving conditions.

Manual adjustment of mirrors by the operator is known to include particular weaknesses inherent to biases and comforting tendencies of the operator making the manual adjustment. One known bias or tendency in operators exhibited in the manual adjustment of mirrors is a tendency to capture in the side mirror fields of vision a portion of the side of the vehicle in the field of vision. The result of the tendency is that blinds spots existing to the outside of the side mirror fields of vision are enlarged. Conventionally accepted preferred fields of vision for side mirrors include the region directly along the side of the vehicle without wasting any field of vision on the side of the vehicle. Different specific embodiments of this preferred field of vision may exist. However, enlarged blind spots created by the above tendency to bias the mirrors inboard occur in vision zones particularly important to information useful in making decisions during lane changes.

Manual mirror adjustment includes another disadvantage, in that an operator, upon entering a vehicle shared with other operators, must take the time to adjust each mirror to the particular location or position of the operator's eyes. Different eyes positions based upon factors such as operator height, posture, and seat configuration preference require different mirror adjustment angles to accurately display the desired fields of vision. Operators are known to disregard mirror adjustment angles or set the angles haphazardly due to the time required to set all three mirrors accurately. Advantages would be therefore be apparent in a method to quickly and reliably automatically set mirror adjustment angles, removing operator biases and tendencies and removing from operator duties the careful adjustment of all three mirrors.

SUMMARY

A plurality of mirrors on a motor vehicle are adjusted by monitoring the position of a first one of the mirrors and adjusting the position of additional ones of the mirrors based on the monitored position of the first one of the mirrors.

BRIEF DESCRIPTION OF THE DRAWINGS

One or more embodiments will now be described, by way of example, with reference to the accompanying drawings, in which.

DETAILED DESCRIPTION

Figure 1:
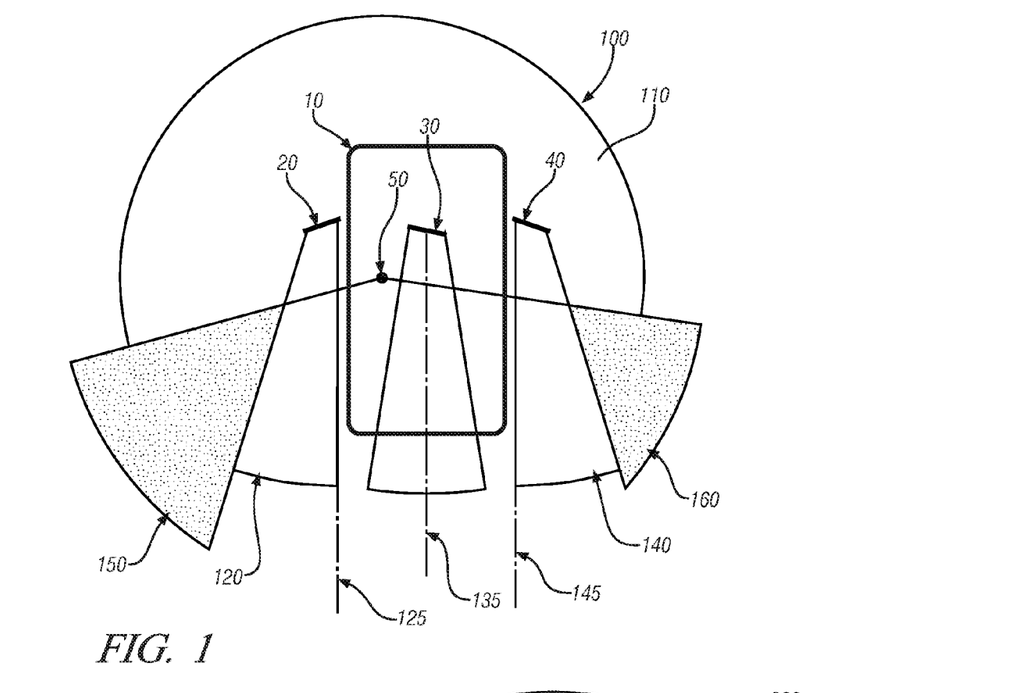
FIG. 1 illustrates an exemplary vehicle equipped with rearview mirrors and resulting fields of view from a horizontal plane perspective, in accordance with the present disclosure.

Referring now to the drawings, wherein the showings are for the purpose of illustrating certain exemplary embodiments only and not for the purpose of limiting the same, FIG. 1 illustrates an exemplary vehicle equipped with rearview mirrors and resulting fields of view from a horizontal plane perspective in accordance with the present disclosure. Vehicle 10 comprises rearview mirrors 20, 30, and 40. Mirror 20 is a left side mirror, mirror 30 is an interior rearview mirror, and mirror 40 is a right side mirror. While the exemplary embodiment includes a commonly known configuration of mirrors in vehicles, it will be appreciated by those having ordinary skill in the art that the methods employed herein are readily adjustable to accommodate other mirror configurations, and this disclosure is not intended to be limited to the specific embodiments described herein. Point 50 is represented as the position of the eyes of an operator of vehicle 10. As is well known, mirrors 20, 30, and 40 are equipped with reflective surfaces, such that the operator may view images from behind the vehicle without significantly turning the operator's head. A mirror provides a field of vision or an image reflecting some visual scope of an area.

A field of vision can be indexed by a center line of a field of vision representing the center of the view of an observer in a resulting field of vision. Alternatively, if the edge of a field of vision is to be aligned to a particular object, then an edge line to a field of vision may be utilized to index the field of vision. As described above, a tendency to adjust side mirrors 20 and 40 inboard to the vehicle exists among operators, and a preferred mirror setting includes fields of vision running along the sides of the vehicle without including the sides of the vehicle. Therefore, edge lines 125 and 145 and center line 135, all three lines running parallel to the longitudinal axis of the vehicle, represent preferred fields of vision from which images will be reflected to the operator. Line 135, especially in a vehicle where the interior rearview mirror is located substantially in the center of the vehicle, is preferably parallel to the body of vehicle 10 in order to give the operator a centered view through a rear window of the vehicle into a lane of traffic directly behind the vehicle. Lines 125 and 145 are represented for simplicity sake in this exemplary embodiment as being parallel to the vehicle, defining fields of vision running alongside the side of the vehicle without showing the vehicle. However, different vehicles, different mirror shapes, different mirror configurations, and other considerations regarding preferred lines of vision for side mirrors can be adjusted for to produce lines 125 and 145 not parallel to vehicle 10.

As described above, mirrors are helpful to allow operators to see the environment around the vehicle. An interior rearview mirror provides a field of vision through the rear window of the vehicle. Side mirrors on the left and right provide fields of vision on the left and right sides of the vehicle, respectively. However, many known mirror configurations in vehicles leave zones which cannot be seen by the vehicle operator known as blind spots. Returning to FIG. 1, a mirror configuration and resulting fields of vision in one exemplary adjustment of the mirrors is depicted. Composite field of vision 100 is depicted representing all fields of vision available to the vehicle operator without significantly turning the operator's head. Field of vision 110 represents the view available to the operator without the use of mirrors. Field of vision 130 represents the view available to the operator through the interior rearview mirror 30, centered upon center line 135. Fields of vision 120 and 140 represent the views available to the operator through mirrors 20 and 40, respectively, and indexed by edge lines 125 and 145, respectively. The resulting composite field of vision available to the operator leaves two blind spots, 150 depicted on the left side of vehicle 10 and 160 depicted on the right side of vehicle 10. Composite field of vision 100 represents a preferred mirror alignment, in particular with reference to mirrors 20 and 40 and resulting fields of vision 120 and 140, allowing the operator to view the region alongside the car while minimizing the resulting blindspots.

Figure 2:
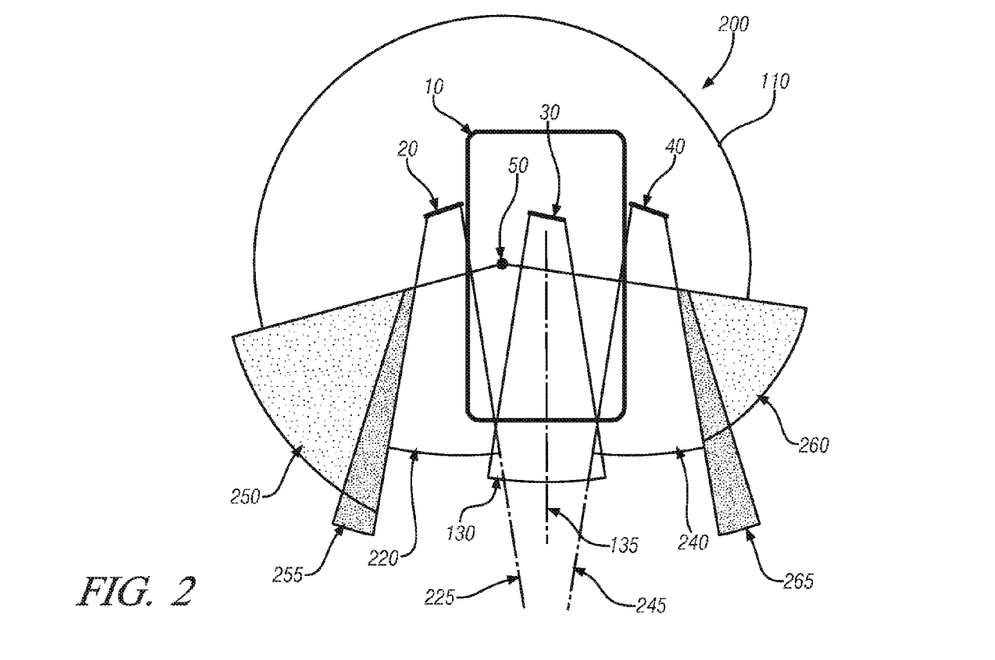
FIG. 2 illustrates an alternative mirror configuration and resulting fields of vision in another exemplary adjustment of the mirrors, in accordance with the present disclosure.

FIG. 2 illustrates an alternative mirror configuration and resulting fields of vision in another exemplary adjustment of the mirrors in accordance with the present disclosure. Composite field of vision 200 is depicted representing all fields of vision available to the vehicle operator without turning the operator's head. Vehicle 10 is depicted, comprising mirrors 20, 30, and 40. Point 50 depicts an exemplary position of the eyes of an operator. Field of vision 110 represents the view available to the operator without the use of mirrors. Field of vision 130 represents the view available to the operator through the interior rearview mirror 30, centered upon center line 135. Fields of vision 220 and 240 represent the views available to the operator through mirrors 20 and 40, respectively, indexed by edge lines 225 and 245, respectively. This setting of mirrors 20 and 40 and the resulting fields of vision 220 and 240 represent a known tendency of operators described above to adjust side mirrors 20 and 40 inboard of the vehicle such that a portion of the sides of vehicle 10 is visible in each mirror view. Such mirror settings with the resulting fields of vision biased inboard to the vehicle reduces the resulting fields of vision outboard of the vehicle. The resulting composite field of vision available to the operator includes two blind spots, 250 depicted on the left side of vehicle 10 and 260 depicted on the right side of vehicle 10, both increased in size from the blind spots depicted in FIG. 1. The increased areas of the blind spots are labeled 255 and 265, representing fields of view lost between the mirror settings represented in FIG. 1 and the new mirror settings in FIG. 2. As a result, the operator viewing composite field of vision 200 has less information about his surroundings. Accordingly, fields of vision as depicted in FIG. 1 can be pre-selected, and mirror adjustment methods can bias mirror arrangements in the vehicle to encourage proper mirror adjustments, minimizing blind spot effects.

The composite fields of view depicted in FIGS. 1 and 2 represent known mirror configurations utilizing three mirrors. Other known mirror configurations with additional or convex mirrors provide augmented fields of view around the vehicle but can be either disorienting to many operators or provide too much information at once to the operator to be useful. However, in whichever configuration mirrors are arranged, optimal fields of view must be adjusted based upon the position of the eyes of the observer in order to provide the best view of the vehicle's surroundings and reduce the impact of any resulting blind spots.

Figure 3:
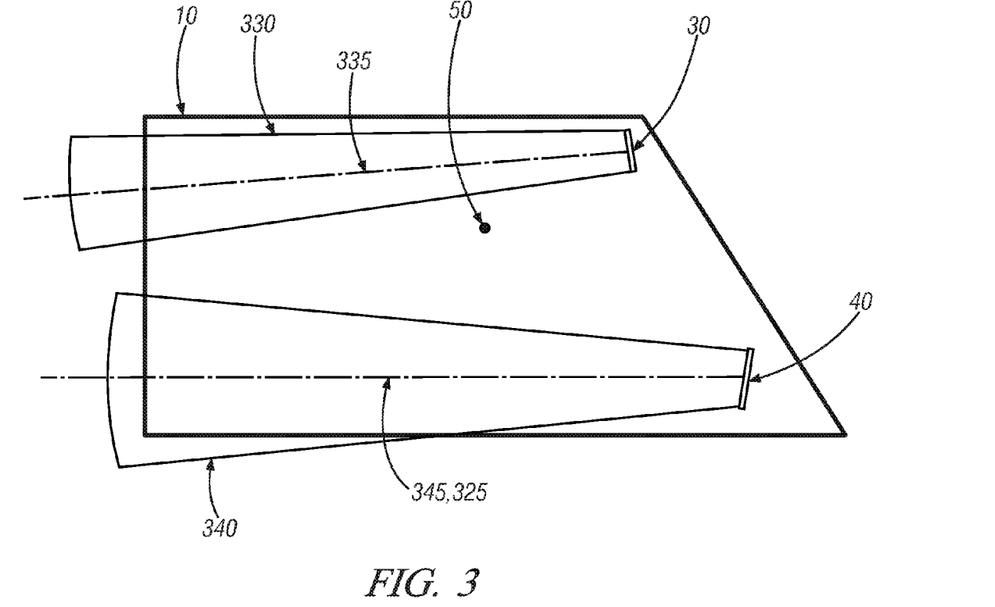
FIG. 3 illustrates an exemplary vehicle equipped with rearview mirrors and resulting fields of view in a vertical plane perspective, in accordance with the present disclosure.

FIG. 3 illustrates an exemplary vehicle equipped with rearview mirrors and resulting fields of view in a vertical plane perspective in accordance with the present disclosure. Vehicle 10 is depicted, comprising mirrors 30 and 40. Point 50 depicts an exemplary position of the eyes of an operator. Fields of vision 330 and 340 represent the views available to the operator through mirrors 30 and 40, respectively, indexed by center lines 335 and 345, respectively. Mirror 20, as described in relation to aforementioned exemplary embodiments, is not pictured, but mirror 20 would occupy in this perspective roughly the same position as mirror 40. As a result, preferred center line 325 resulting from mirror 20 is represented as coincident with center line 345. Although unaffected by the tendency described above and frequently not contributing to a blind spot, mirrors in the vehicle must still be adjusted with reference to the vertical plane.

A method is disclosed wherein an adjustment to one rearview mirror can be utilized to automatically adjust remaining rearview mirrors. Properties of mirrors and light reflection are well known in the art and will not be discussed in detail herein. However, the following includes details most relevant to the present disclosure. In the context of vehicular mirrors, light travels in a straight line. Mirrors predictably reflect light, with the angle of the reflection in any plane of observation being bisected by a centerline of the mirror projected perpendicular to the mirror surface. Returning to FIG. 1, lines used to index mirrors 20, 30, and 40 are represented by lines 125, 135, and 145, respectively. By adjusting the angle of an otherwise fixed mirror, the resulting view available to a fixed observer of the mirror surface will change proportionally to the mirror angle. Mirror adjustment necessarily involves a set of known values, known geometric relationships, and a set of unknown angles. Through an input of angles to one mirror and a set of known values and geometric relationships within the vehicle, calculations can be made and unknown angles can be solved for. Known geometric relationships frequently include known locations of the pivot points of mirrors 20, 30, and 40, locations of preferred index lines as discussed above, a centerline of the driver seat upon which an operator's eyes are likely to be centered upon, and potentially an operator's seat position. Once a mirror is adjusted by the operator, yielding a measurement intersecting the centerline of the driver's seat as an estimate of a position of the operator's eyes, mirror angles yielding preferred lines of vision for the remaining rearview mirrors can be generated based upon the estimated position of the operator's eyes.

The method disclosed herein may be based upon the adjustment of any known mirror, wherein manually calibrated mirror settings can be used to solve for the recommended angles of the remaining un-calibrated mirrors. However, as described above, settings for side mirrors, especially manual calibrations by operators of side mirrors, may be subject to fields of vision and biases not based on reducing blind spots. However, the interior rearview mirror is not subject to such biases and tends to be accurately centered upon the rear window of the vehicle. As a result, a preferred embodiment of the present disclosure includes utilizing manual calibration of the rearview mirror to solve for and control automatic mirror calibration of the remaining mirrors.

Determining adjustment angles for use in automatically moving side mirrors to create optimized fields of vision for the operator can be performed analytically based upon the operator's adjustment of the internal rearview mirror. Because rearview mirrors are typically fixed by a pivot point, a rearview mirror's adjustment around the pivot point is describable in two planes, a horizontal plane, describing the mirror adjustment angles as mirror sections in a plane from a top down view, and a vertical plane, describing the mirror adjustment angles as mirror sections in a plane from a right side or left side view. By using known relationships between the mirrors and an estimated position of the operator's eyes, one can solve for these adjustment angles in each plane for each side mirror, thereby generating the information necessary to utilize the disclosed method.

Figure 4:
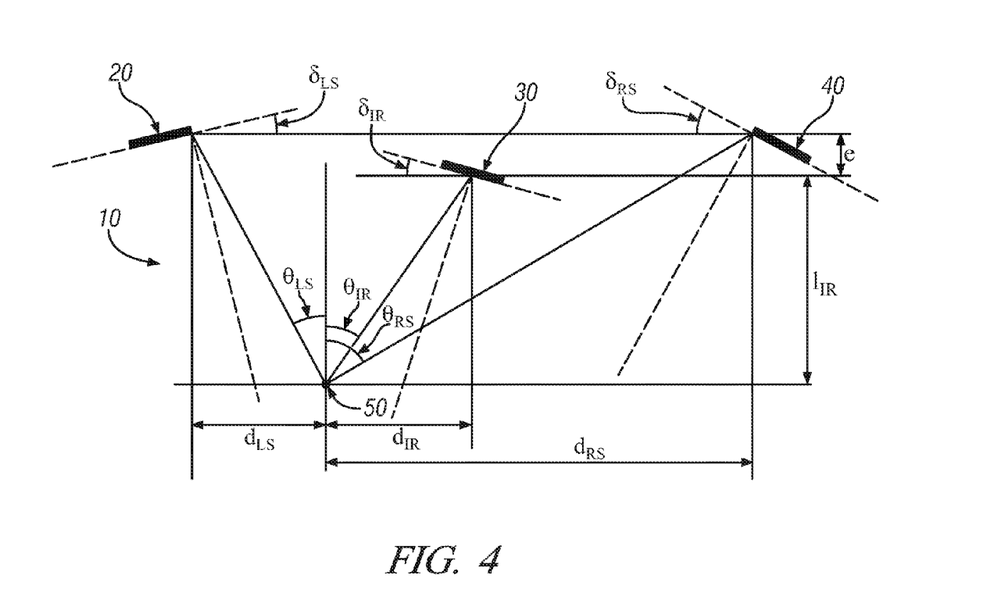
FIG. 4 is a schematic illustration of an exemplary vehicle equipped with rearview mirrors, including descriptive elements for use in an exemplary process to set side mirror adjustment angles, in a horizontal plane, in accordance with the present disclosure.

FIG. 4 is a schematic illustration of an exemplary vehicle equipped with rearview mirrors, including descriptive elements for use in an exemplary process to set side mirror adjustment angles, in a horizontal plane in accordance with the present disclosure. Vehicle 10 comprises rearview mirrors 20, 30, and 40, consistent with the exemplary embodiments described above. As described above, solving for the side mirror adjustment angles in the horizontal plane can be performed by inputting an adjustment angle from the rearview mirror, as manually adjusted by the operator, and utilizing known relationships between the various mirrors and the operator's likely position within an algorithm, utilizing for example trigonometric formulas well known in the art, to calculate the side mirror adjustment angles. Many embodiments of functions manipulating values to generate side mirror adjustment angles are envisioned. FIG. 4 demonstrates an exemplary analysis of relationships useful in a process to determine side mirror adjustment angles through the disclosed method.

Referring to FIG. 4, a horizontal plane angle from the operator's eyes to the internal rearview mirror, $\theta_{IR}$, can be estimated as follows, where $\delta_{IR}$ represents the horizontal plane adjustment angle for the manually adjusted internal rearview mirror.

$$\theta_{IR} = 2\delta_{IR} \quad (1)$$

This relationship is apparent to one having ordinary skill in the art, given that an angle from a viewer to the resulting field of vision is always bisected by a normal projection from the flat mirror surface. Applied to the present application where the field of vision is indexed by a line running parallel to the longitudinal axis of the vehicle, the adjustment angle of the mirror, as described by the flat surface of the mirror normal to the bisecting line and as referenced to the lateral axis of the vehicle, will always be half the angle of the operator to the parallel index line of the field of vision. Given $\theta_{IR}$ and applying a simple trigonometric function based upon a right triangle with perpendicular sides $d_{IR}$ and $l_{IR}$, one can calculate the longitudinal distance from the operator's eyes to the rearview mirror.

$$l_{IR} = \frac{d_{IR}}{\tan(2\delta_{IR})} \quad (2)$$

This term, $l_{IR}$, sets in the horizontal plane the position of the operator's eyes (estimated as a single point) along the centerline of the driver's seat of the vehicle. Once the position of the operator's eyes has been estimated, the relationship of the operator's eyes to a fixed location on a side mirror can be calculated through a similar trigonometric function. Thus, the horizontal plane angle from the operator's eyes to the left side mirror, $\theta_{LS}$, utilizing a right triangle with perpendicular sides $d_{LS}$ and $e+l_{IR}$, can be expressed as follows:

$$\theta_{LS} = \tan^{-1}\left(\frac{d_{LS}}{e + l_{IR}}\right) = \tan^{-1}\left(\frac{d_{LS}}{e + \frac{d_{IR}}{\tan(2\delta_{IR})}}\right) \quad (3)$$

Similarly, the horizontal plane angle from the operator's eyes to the right side mirror, $\theta_{RS}$, can be expressed as follows:

$$\theta_{RS} = \tan^{-1}\left(\frac{d_{RS}}{e + l_{IR}}\right) = \tan^{-1}\left(\frac{d_{RS}}{e + \frac{d_{IR}}{\tan(2\delta_{IR})}}\right) \quad (4)$$

In both equations 3 and 4, one having ordinary skill in the art will note that for simplicity, the mirror is assumed to rotate or pivot around the innermost corner of the mirror. Mechanisms within the mirror actuation mechanisms that manipulate the mirrors can be used to effect this result, or alternatively a correction factor can be utilized to correct for the actual pivot point of the mirror. Numerous embodiments of the correction factor are envisioned, for example modifying equations 3 and 4 to calculate to the actual pivot points of the mirror and then correcting to the inside corner or a calibrated correction factor tabulated in a look-up table, are envisioned. If such a look-up table is utilized, the values for the correction factors may be developed experimentally, empirically, predictively, through modeling or other techniques adequate to accurately predict mirror movements. Returning to the exemplary equations, $\delta_{LS}$, or the horizontal plane adjustment angle for the left side mirror, based upon the above simplifying assumptions, may therefore be expressed as the following:

$$\delta_{LS} = \frac{\theta_{LS}}{2} = \frac{1}{2}\tan^{-1}\left(\frac{d_{LS}}{e + \frac{d_{IR}}{\tan(2\delta_{IR})}}\right) \quad (5)$$

Likewise, $\delta_{RS}$, the horizontal plane adjustment angle for the right side mirror, may be expressed as the following:

$$\delta_{RS} = \frac{\theta_{RS}}{2} = \frac{1}{2}\tan^{-1}\left(\frac{d_{RS}}{e + \frac{d_{IR}}{\tan(2\delta_{IR})}}\right) \quad (6)$$

By utilizing the above relationships, a method can be utilized to accept as an input a horizontal plane adjustment angle for the right side mirror, $\delta_{IR}$, and generate as an output $\delta_{LS}$ and $\delta_{RS}$. These values can then be transferred to side mirror control mechanisms, and utilized to control automatic mirror settings, providing the operator with coordinated fields of view.

Figure 5:
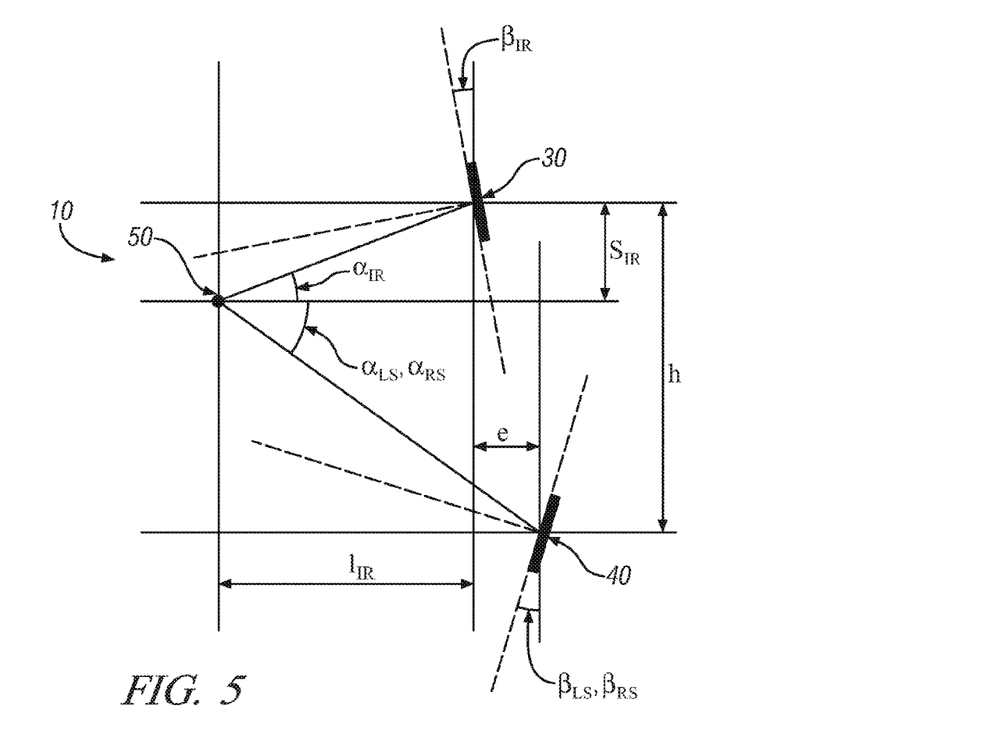
FIG. 5 is a schematic depiction illustrating an exemplary process whereby mirror adjustment angles in a vertical plane can be calculated in accordance with the present disclosure.

FIG. 5 is a schematic depiction illustrating an exemplary process whereby mirror adjustment angles in a vertical plane can be calculated in accordance with the present disclosure. Vehicle 10 comprises rearview mirrors 30 and 40, consistent with the exemplary embodiments described above. $\beta_{IR}$ represents the vertical plane adjustment angle for the manually adjusted internal rearview mirror. As noted above, the angle for the operator's eyes to a line running parallel to the longitudinal axis of the vehicle ($\alpha_{IR}$), indexing a resulting field of vision, can be described as follows:

$$\alpha_{IR} = 2\beta_{IR} \quad (7)$$

In the horizontal plane, a measure of the distance from the center of the operator seat to the internal rearview mirror is available to estimate a position of the operator's eyes. Location of the operator is intrinsically available in the vertical plane; however, the longitudinal distance of the operator's eyes to the mirror, $l_{IR}$, is available from the previous calculations. As above, applying a simple trigonometric function based upon a right triangle with perpendicular sides $l_{IR}$ and $S_{IR}$, one can estimate the vertical distance from the operator's eyes to the rearview mirror.

$$S_{IR} = \frac{\tan(\alpha_{IR})}{l_{IR}} = \frac{\tan(2\beta_{IR})}{l_{IR}} \quad (8)$$

Once $S_{IR}$ is estimated and the location of the operator's eyes is apparent, the angle from the operator's eyes to the side mirrors in the vertical plane ($\alpha_{LS}$, $\alpha_{RS}$), utilizing known geometrical relationships, can be solved for $$\alpha_{LS} = \alpha_{RS} = \tan^{-1}\left(\frac{h - S_{IR}}{l_{IR} + e}\right) \quad (9)$$

Because the right side mirror and the left side mirror are frequently located at the same vertical position on a vehicle, this equation equates the angles $\alpha_{LS}$ and $\alpha_{RS}$. However, it will be appreciated that a simple modification to the equation can be performed if a vehicle were to utilize side mirrors at different vertical positions. As before, the mirror adjustment angles in the vertical plane in comparison to a vertical axis in the vehicle, when referenced to an index line running parallel to the longitudinal axis of the vehicle, equal one half of the angle from the operator's eyes to the side mirrors in the vertical plane, yielding the following relationship:

$$\begin{aligned} \beta_{LS} &= \beta_{RS} \quad (10) \\ &= \frac{1}{2}\tan^{-1}\left(\frac{h - S_{IR}}{l_{IR} + e}\right) \\ &= \frac{1}{2}\tan^{-1}\left(\frac{h - \frac{\tan(2\beta_{IR})\tan(2\delta_{IR})}{d_{IR}}}{\frac{d_{IR}}{\tan(2\delta_{IR})} + e}\right) \end{aligned}$$

Calculated thusly, input angles from a manual adjustment of a rearview mirror can be used to generate side mirror adjustment angles.

Figure 6:
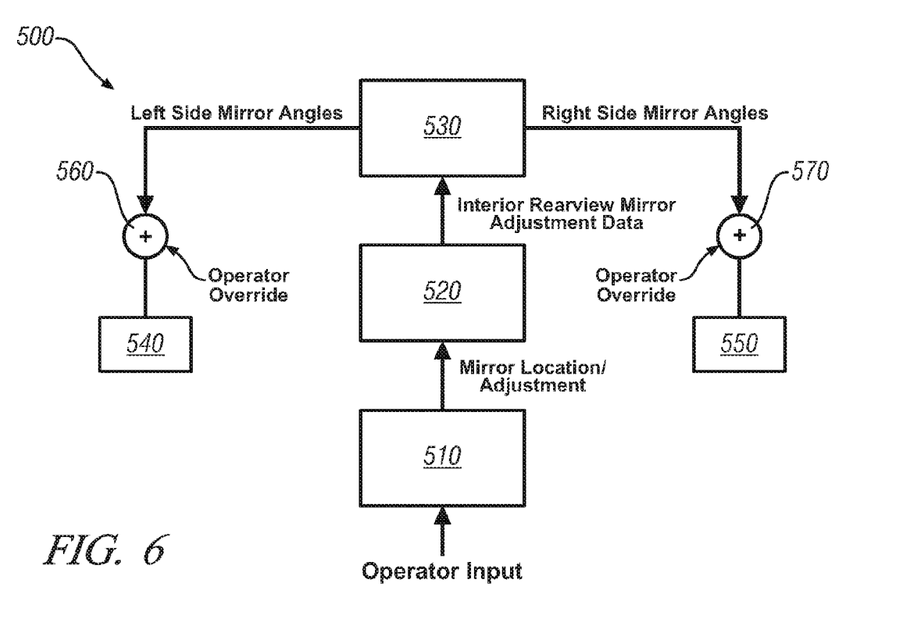
FIG. 6 schematically depicts and exemplary mirror control system in accordance with the present disclosure.

FIG. 6 schematically depicts and exemplary mirror control system in accordance with the present disclosure. Mirror control system 500 comprises an internal rearview mirror adjustment sensor 510, a processing module 520, a side mirror command module 530, and mirror actuation assemblies 540 and 550. Internal rearview mirror adjustment sensor 510 includes any one of a number of devices known in the art to sense a pivot location for an attached interior rearview mirror. Such devices are known to generate a stream of information relating the adjustment of the pivot, for example, as x-axis and y-axis terms. In the present application, when an operator manually adjusts the interior rearview mirror, presumably centering the field of vision generated in the mirror with the rear window of the vehicle based upon the location of the operator's eyes, a signal is generated relaying the precise adjustment of the mirror. This signal is received by processing module 520 and can be processed and interpreted into a horizontal plane adjustment angle for the rearview mirror, $\delta_{IR}$, as described above and a vertical plane adjustment angle for the rearview mirror, $\beta_{IR}$, as described above. By the methodology described above, these angles can be utilized in conjunction with other known values to determine optimized adjustment angles in the horizontal and vertical planes. These optimized adjustment angles, in the exemplary configuration of FIG. 6, are then received by side mirror command module 530, which translates, by methods well known in the art, the optimized adjustment angles into commands to mirror actuation assemblies 540 and 550. Mirror actuation assemblies employ an electric motor or motors or similar mechanical means to carry out the commands issued by mirror command module 530, adjusting the physical orientation of the side mirrors. Additionally, as described above, the method disclosed herein additionally contemplates allowing an operator to override the automatic adjustments of the side mirrors. Side mirror override devices 560 and 570 are provided to allow the operator, dissatisfied with the mirror adjustments driven by the disclosed method, to impose manual settings upon the mirrors, for example, through a joystick input device. Internal rearview mirror adjustment sensor 510, processing module 520, and side mirror command module 530 are depicted in FIG. 6 as distinct modules. It will be appreciated by one having ordinary skill in the art that these modules can physically exist separately or in combinations within the same device. For instance, a device is contemplated that can exist entirely within the rearview mirror casing which can sense rearview mirror adjustment, process the information accordingly, and issue commands to mirror actuation assemblies 540 and 550. Acting as described in FIG. 6, mirror control system 500 translates a manual adjustment of an internal rearview mirror into optimized side mirror adjustment angles, effective to calibrate mirror fields of vision to the particular position of the operator's eyes while preferring fields of vision accepted as improving safety through the minimization of blind spots.

The control system and related modules employed in the control of rearview mirrors preferably comprise a subset of an overall control system architecture operable to provide coordinated system control of a vehicle engine and other systems. In overall operation, the control system is operable to, for example, synthesize operator inputs, ambient conditions, engine operating parameters, and combustion performance measurements, and execute algorithms to control various actuators to achieve targets for control parameters, including such parameters as fuel economy, emissions, performance, and driveability. The overall control system is operably connected to a plurality of devices through which an operator typically controls or directs operation of the engine. Exemplary operator inputs include an accelerator pedal, a brake pedal, transmission gear selector, and vehicle speed cruise control when the engine is employed in a vehicle. The overall control system architecture may communicate with other controllers, sensors, and actuators via a local area network ('LAN') bus (not shown) which preferably allows for structured communication of control parameters and commands between various controllers. In one embodiment, the mirror control system may communicate with mirror control related controllers, sensors, and actuators via a control area network ('CAN') bus (not shown) which also preferably allows for structured communication between various controllers.

The mirror control system and related modules preferably comprise a general-purpose digital computer or computers generally comprising a microprocessor or central processing unit, read only memory (ROM), random access memory (RAM), electrically programmable read only memory (EPROM), high speed clock, analog to digital (A/D) and digital to analog (D/A) circuitry, and input/output circuitry and devices (I/O) and appropriate signal conditioning and buffer circuitry. Each controller has a set of control algorithms, comprising resident program instructions and calibrations stored in ROM.

The mirror actuation assembly includes an actuator or electric motor device capable of transforming electrical signals into a mechanical force, most commonly a torque applied to an output shaft. The mirrors are mechanically attached to the output of the actuator through a mechanical means, such as a threaded shaft assembly, a cam device, or other methods well known in the art. Two or more actuators are frequently used to enable adjustment of the mirror in a plurality of directions, for example, as referenced by a horizontal and vertical plane.

Algorithms for use in the mirror control system are typically executed during preset loop cycles such that each algorithm is executed at least once each loop cycle. Algorithms stored in the non-volatile memory devices are executed by the central processing unit and are operable to monitor inputs from the sensing devices and execute control and diagnostic routines to control operation of the system, using preset calibrations. Loop cycles are typically executed at regular intervals, for example each 3.125, 6.25, 12.5, 25 and 100 milliseconds during ongoing vehicle operation. Alternatively, algorithms may be executed in response to occurrence of an event or interrupt request.

The methods described herein have been presented in terms of x-axes and y-axes, with indexes running parallel with the longitudinal axis of the vehicle, for the purpose of illustrating the concept of the method clearly. However, it will be appreciated by one having ordinary skill in the art that actual coordinate systems utilized by the sensors, processors and command modules need not follow the overall axes of the vehicle. For instance, the internal rearview mirror adjustment sensor 510, described in FIG. 6, may employ a radially based coordinate system to describe the degree of pivot of the rearview mirror. Additionally, the trigonometric expressions make certain assumptions, such as the optimized fields of view of the side mirrors being indexed by lines running parallel to the longitudinal axis of the vehicle. It will be appreciated by one having ordinary skill in the art that use of non-parallel indexes or other small adjustments to the mirrors, related fixturing, or related methods of alignment can be accounted for through simple modifications of the above equations, such as by adding compensation terms to the resulting angles or redefining the reference triangles used in the trigonometric calculations. The disclosure, while illustrating the concepts of the method through the depicted exemplary embodiments, does not intend to be limited specifically thereto.

Once a method is employed to automatically adjust side mirrors based upon an estimated operator's eyes position, multiple improvements to the vehicle become available to the vehicle based upon the information resulting from the adjustment. For instance, based upon estimated eyes position, gauges, displays, control locations, and other information required by the operator for proper use of the vehicle during travel can be moved, for example on pivots or slides powered by electric motors coupled with control mechanisms, or otherwise manipulated, for instance, a video display altering the location information presented, to compensate for the operator's eyes position. Additionally, information created during the process of adjusting mirrors at one event or during one operating cycle can be stored and processed in order to make use of the information. For example, the method described above discusses the ability of an operator to override the automatic adjustment of the side mirrors. The information resulting from the overriding function can be analyzed, and through the use of algorithms, for example, algorithms known in the art as machine learning algorithms, the automatic adjustment can be made to adopt the preferences of the operator, biasing the automatic adjustments for a particular operator by some factor. Such a biasing function can have the added benefit of allowing a training function to be utilized, wherein the bias is slowly reduced over time to train the operator away from not recommended mirror settings. Such use of an overriding function and a related biasing function can be authoritative, with the resulting mirror adjustment being permanently fixed until reset, for example by a new internal rearview mirror adjustment, or the use and the resulting mirror adjustment angles can be subject to modification based upon vehicle operating conditions, such as vehicle speed. For example, an operator override of side mirror adjustment angles can be utilized under low speed conditions, but if the vehicle speed passes a high vehicle speed threshold, an algorithm can be utilized to bias the side mirror adjustment angles toward or to the optimized side mirror adjustment angles, based upon the added risk and the importance of operator perception associated with higher vehicle speeds. Additionally, the method can include a high speed lane change function initiated by vehicle conditions indicating an imminent lane change, for example information related to a turn signal, a GPS device, driving habits learned about a particular operator, and side mirror adjustment angles can be optimized for the lane change, for instance adjusting momentarily more outboard to provide the operator with more information about the area in the neighboring lane. Additionally, information generated during a mirror adjustment event can additionally be utilized and/or cross referenced with additional information, allowing for fully automatic mirror adjustment during future vehicle operation cycles. For example, during a first mirror adjustment event concluding with a side mirror adjustment, information from other vehicle sensors or methods known in the art, such as but not limited to seat position, operator weight through sensors in the seat, presence of a particular key or key fob device, manual operator identification means, or biometric operator identification, can be used to program an operator specific mirror adjustment matrix. This operator specific matrix can then be used, in subsequent vehicle operation cycles, to adjust any or all of the mirrors, including the internal rearview mirror, to angles utilized according to the matrix.

Figure 7:
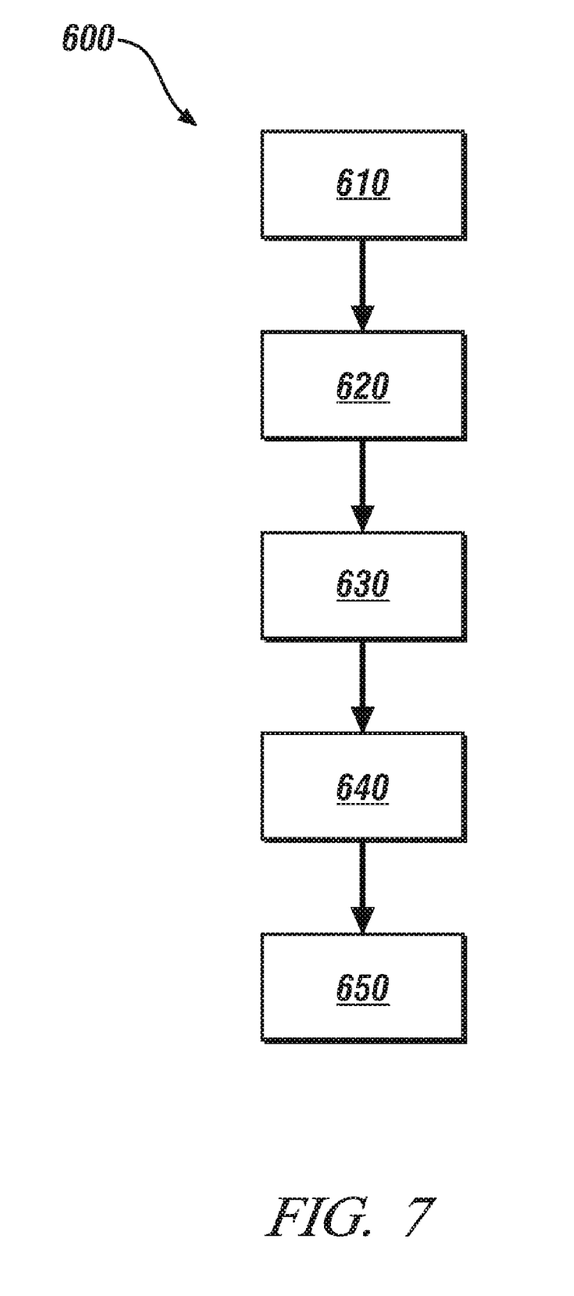
FIG. 7 schematically illustrates a method to automatically adjust mirrors in a vehicle in accordance with the present disclosure.

FIG. 7 schematically illustrates a method to automatically adjust mirrors in a vehicle. Table 1 is provided as a key to FIG. 7 wherein the numerically labeled blocks and the corresponding functions are set forth as follows.

TABLE 1

| BLOCK | BLOCK CONTENTS |
| --- | --- |
| 610 | Monitor Operator Adjustment to an Interior Rearview Mirror Position |
| 620 | Determine an Eye Position of the Operator based upon the Monitored Adjustment |
| 630 | Calculate Preferred Positions for Side Mirrors Based Upon the Eye Position |
| 640 | Control Side Mirror Positions based upon the Preferred Positions |
| 650 | Adjust Mirror Positions from the Preferred Positions Based upon an Override Function |

Process 600 begins with block 610, wherein an adjustment to an interior rearview mirror by an operator of the vehicle is monitored. At block 620, an eye position for the operator is determined according to methods disclosed herein. At block 630, preferred positions for side mirrors of the vehicle are determined based upon the determined eye position. At block 640, side mirror positions are controlled based upon the respective determined preferred positions. At block 650, an override function is executed permitting the operator to adjust mirror position according to methods disclosed herein. Any of the alternative embodiments presented herein can be used in combination with the presented process 600, for example, including iterative analysis of an overriding input by the operator, using a training cycle to reduce a difference between an override position and a recommended mirror position, and allowing or disallowing an override function based upon a speed of the vehicle, and the disclosure is not intended to be limited to the particular exemplary embodiments provided herein.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for automatically adjusting mirror position on a motor vehicle, comprising:
    controlling a side mirror position based upon a preferred position through a plurality of iterations, each iteration comprising:
        monitoring an interior rearview mirror position;
        determining an eye position of a vehicle operator based upon said interior rearview mirror position and geometric relationships with respect to said vehicle;
        calculating said preferred position for said side mirror based upon said eye position; and
        controlling said side mirror position to said preferred position;
    for each of said iterations, monitoring operator input to an override function allowing said vehicle operator to override said control of said side mirror from said preferred position to an override position;
    analyzing said operator inputs for said plurality of iterations to correct said preferred position based upon said iterative operation; and
    controlling said side mirror position based upon said corrected preferred position.

2. The method of claim 1, wherein analyzing said operator inputs for said plurality of iterations comprises utilizing a machine learning algorithm.

3. Method for automatically adjusting mirror position on a motor vehicle, comprising
    monitoring an interior rearview mirror position;
    determining an eye position of a vehicle operator based upon said interior rearview mirror position and geometric relationships with respect to said vehicle;
    calculating a preferred position for a side mirror based upon said eye position; and
    controlling said side mirror position to said preferred position;
    wherein said controlling further comprises an override function allowing said vehicle operator to override said control of said side mirror position to an override position;
    wherein said calculating said preferred position comprises machine learning algorithms including learning operator preferences through iterative operation of said override function and biasing said preferred position to said override position; and wherein said calculating said preferred position further comprises a training function to diminish said biasing over multiple vehicle operation cycles.

4. Method for automatically adjusting mirror position on a motor vehicle, comprising monitoring an interior rearview mirror position;

determining an eye position of a vehicle operator based upon said interior rearview mirror position and geometric relationships with respect to said vehicle;

calculating a preferred position for a side mirror based upon said eye position; and controlling said side mirror position to said preferred position;

wherein said controlling further comprises an override function allowing said vehicle operator to override said control of said side mirror position to an override position; and wherein said override function is effective only when said vehicle is operating below a predetermined speed.

5. The method of claim 3, further comprising pre-adjusting said side mirror based upon at least one of seat settings, operator weight, particular key fob presence, operator identification, or biometric identification.

6. The method of claim 5, further comprising pre-adjusting said interior rearview mirror based upon at least one of seat settings, operator weight, particular key fob presence, operator identification, or biometric identification.

7. The method of claim 1, further comprising:

monitoring vehicle operating conditions; and controlling said side mirror position to an outboard position when said monitored vehicle operating conditions indicate an incipient high speed lane change.

8. The method of claim 1, further comprising utilizing said eye position to adjust position properties of at least one of gauges, visual displays, and control mechanisms within said vehicle.

9. Apparatus for automatically adjusting a mirror on a motor vehicle to produce a pre-selected field of vision to a vehicle operator based upon a manual adjustment of an interior rearview mirror, said apparatus comprising:

an internal rearview mirror adjustment sensor;

a side mirror actuation assembly;

a processing module receiving input from said sensor and comprising logic to estimate an eye position for said vehicle operator and logic to calculate side mirror adjustment angles for said side mirror actuation assembly based upon said eye position;

receiving operator input to an override function allowing said vehicle operator to override said control of said side mirror position to an override position;

determining commanded mirror angles based upon said override position when said vehicle is operating below a predetermined speed; and determining commanded mirror angles based upon said calculated side mirror adjustment angles when said vehicle is operating above said predetermined speed; and a side mirror command module effecting signals to control said side mirror actuation assembly based upon said commanded mirror angles.

10. The apparatus of claim 9, wherein said processing module and said side mirror command module are operated within a single device.

11. The apparatus of claim 9, further comprising a second side mirror actuation assembly; and wherein said processing module further comprises logic to calculate side mirror adjustment angles for said second side mirror actuation assembly based upon said eye position.

* * * * *